(12) United States Patent  (10) Patent No.: US 8,255,068 B2
Yoshimura  (45) Date of Patent: Aug. 28, 2012

(54) METHOD OF CONFIGURING A CONTROL ALGORITHM BEING EXECUTABLE BY A CONTROLLER

(75) Inventor: Kentaro Yoshimura, Paris (FR)

(73) Assignee: Hitachi, Ltd., Tokyo (JP)

( * ) Notice: Subject to any disclaimer, the term of this patent is extended or adjusted under 35 U.S.C. 154(b) by 140 days.

(21) Appl. No.: 12/104,804

(22) Filed: Apr. 17, 2008

(65) Prior Publication Data

US 2008/0262640 A1 Oct. 23, 2008

(30) Foreign Application Priority Data

Apr. 20, 2007 (EP) .................................... 07008079

(51) Int. Cl.
*G05B 19/42* (2006.01)
*G06F 9/44* (2006.01)
*G06F 9/46* (2006.01)
(52) U.S. Cl. .......... 700/89; 717/120; 718/102; 718/107
(58) Field of Classification Search .................... 700/89; 717/120, 121; 718/102
See application file for complete search history.

(56) References Cited

U.S. PATENT DOCUMENTS

| 6,948,171 B2 * | 9/2005 | Dan et al. ...................... 718/100 |
| 7,194,324 B2 * | 3/2007 | Sollner .......................... 700/97 |
| 2004/0060050 A1 * | 3/2004 | Bieringer ..................... 718/102 |
| 2004/0133879 A1 * | 7/2004 | Yoshimura et al. ........... 717/120 |
| 2007/0016659 A1 * | 1/2007 | Peck et al. ..................... 709/220 |

OTHER PUBLICATIONS

Takanor Yokoyama, "An Aspect-Oriented Development Method for Embedded Control Systems with Time-Triggered and Event-Triggered Processing", IEEE Computer Society, Mar. 2005, pp. 302-311.

* cited by examiner

*Primary Examiner* — Mohammad Ali
*Assistant Examiner* — Sivalingam Sivanesan
(74) *Attorney, Agent, or Firm* — Crowell & Moring LLP

(57) ABSTRACT

The present invention relates to a method of configuring a control algorithm being executable by a controller, a controller for controlling a plant in real-time, and a control algorithm generator. An important aspect of the invention is that the control algorithm is subdivided into at least one task and task activation time periods are assigned to each task of the at least one task based on data about the control algorithm and data about the plant to be controlled, wherein the execution of the tasks of the control algorithm is scheduled in accordance with the assigned task activation time periods.

26 Claims, 7 Drawing Sheets

METHOD OF CONFIGURING A CONTROL ALGORITHM BEING EXECUTABLE BY A CONTROLLER

CLAIM OF PRIORITY

The present application claims priority from European Patent application No. 07008079.1 filed on Apr. 20, 2007, the content of which is hereby incorporated by reference into this application.

BACKGROUND OF THE INVENTION

1. Field of the Invention

The present invention relates to a method of configuring a control algorithm being executable by a controller for controlling a plant in real-time, a controller for controlling a plant in real-time, and a control algorithm generator for generating a control algorithm being executable and configurable by a controller.

Such controllers are used especially in the mechanical domain, for example for controlling automotive engines, robots, construction machinery, avionics etc.

2. Description of the Related Art

A controller for controlling a plant in real-time is known, for example, from US 2004/0133879. This prior art document discloses a controller being able to execute a software component comprising a control model according to which a plant is controlled.

The article "An Aspect-Oriented Development Method for Embedded Control Systems with Time-Triggered and Event-Triggered Processing" by Takanori Yokoyama, published in the proceedings of the 11$^{th}$ IEEE Real-Time and Embedded Technology and Applications Symposium, pages 302-311, 2005, discloses a method for improving the reusability of control models and source code for controllers being able to execute software components comprising a control algorithm. However, in spite of this method, reusing software components across different controllers still entails a lot of effort.

Figure 1:
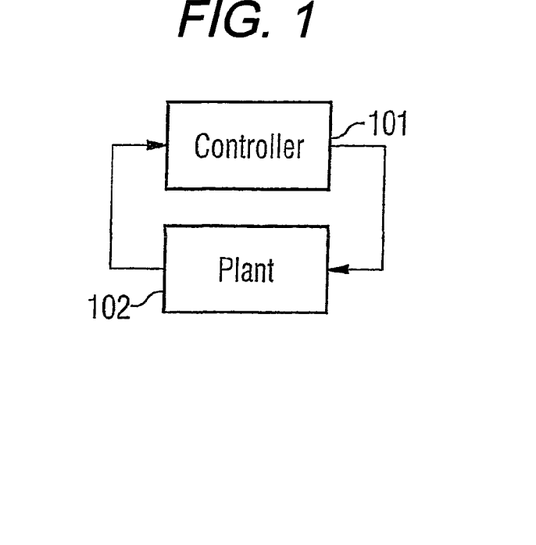
FIG. 1 shows a generic control system.

The general prior art will be discussed in more detail with reference to the FIGS. 1-4. FIG. 1 shows a generic control system comprising a controller 101 that controls a plant 102 (control target) and receives feedback information from the plant 102 such that the controller 101 is able to determine adequate control signals for controlling the plant 102.

Figure 2:
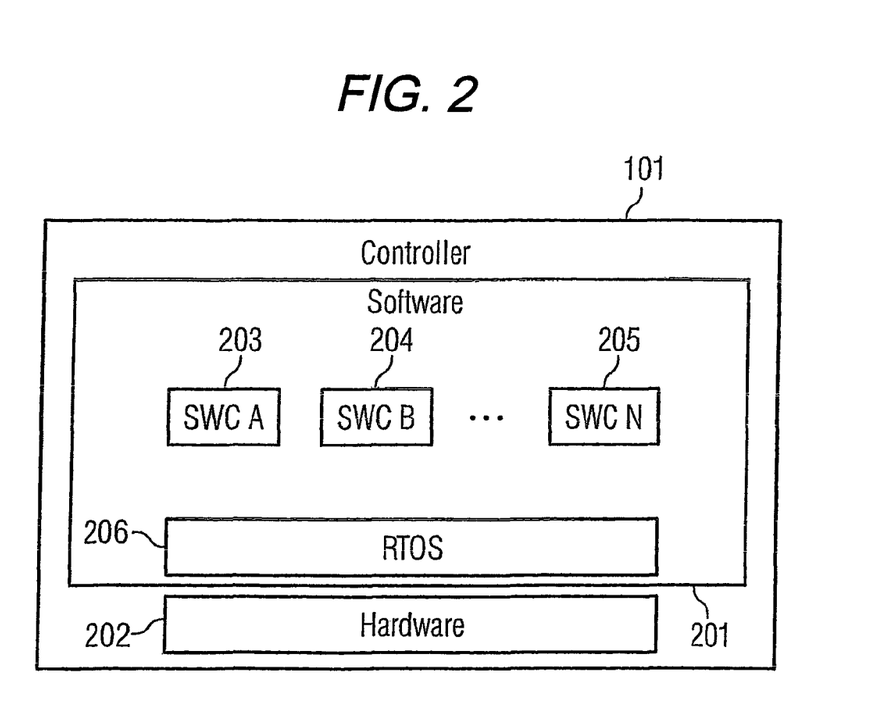
FIG. 2 shows a generic controller.

FIG. 2 depicts a controller more closely. A controller comprises a hardware 202 and software 201. The software 201 comprises a real-time operating system 206 and software components that may comprise a control algorithm (software component A 203, software component B 204, and further software components (software component n 205)). The real-time operating system activates the software components periodically and/or based on events in order to execute the control algorithms.

Figure 3:
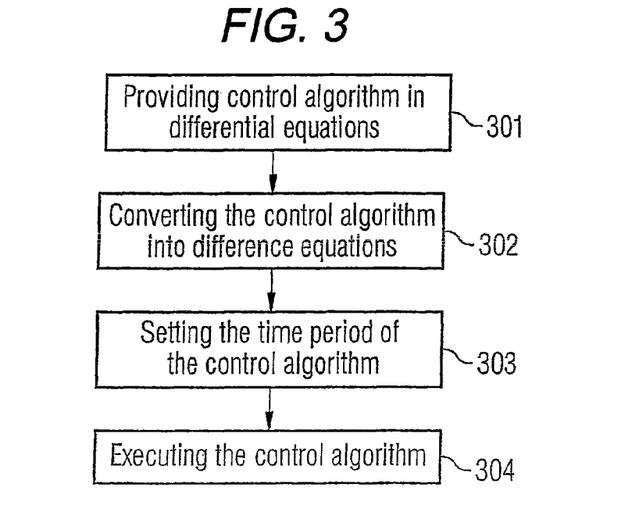
FIG. 3 shows a method of configuring a control algorithm according to the prior art.

In the prior art, such controllers as depicted in FIG. 2 are in general configured by the method shown in FIG. 3. First, a suitable control algorithm is provided in differential equations (step 301). This control algorithm in differential equations is then converted into difference equations (step 302), such that the control algorithm can be executed by a digital controller. Afterwards, the time period of the control algorithm is set manually (step 303). Afterwards, the control algorithm is executed in step 304.

Figure 4:
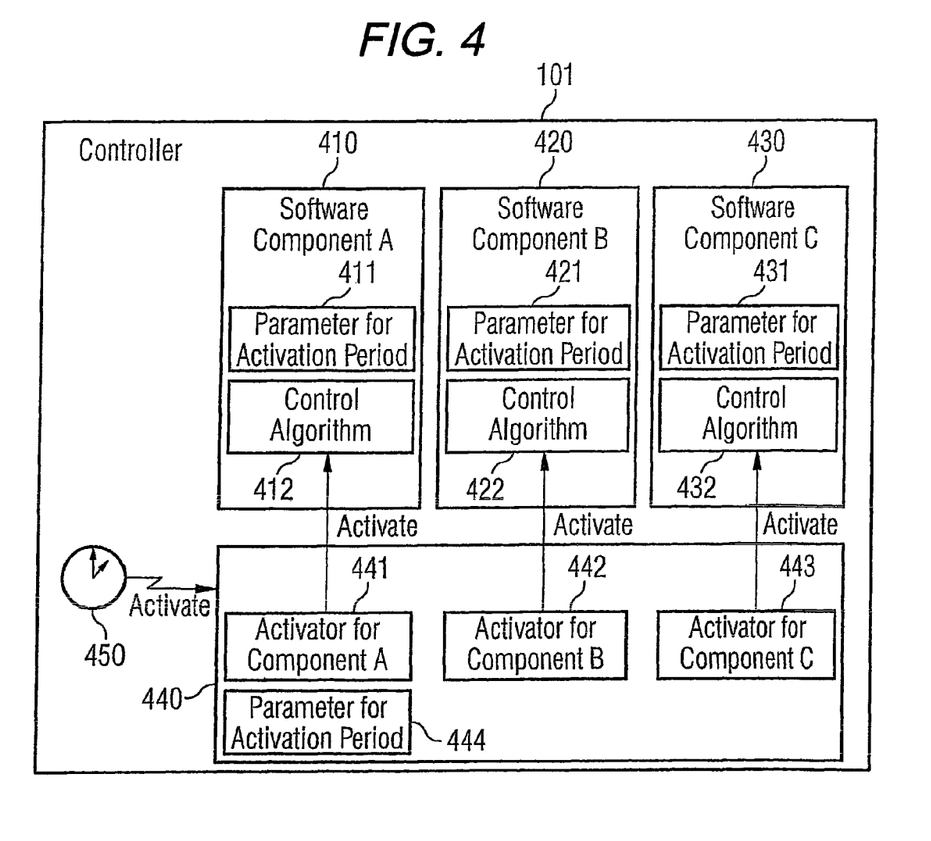
FIG. 4 shows details of a controller according to the prior art.

FIG. 4 shows further important details of a controller 101 of the prior art. The shown controller comprises a software component A 410 that comprises a control algorithm 412 and parameters 411 that define the activation period for the control algorithm. Furthermore, the shown controller 101 comprises a software component B 420 with according parameters 421 for the activation period of the control algorithm 422. In addition, the shown controller 101 comprises a software component C 430 comprising a control algorithm 432 whose activation period is defined by the parameters for activation period 431.

The control algorithms 412, 422, 432 of the software components A-C 410, 420, 430 are activated by according activators 441, 442, 443. These activators are comprised in a periodic task scheduler 440 that is comprised in the real-time operation system. Each activator is activated by a clock 450. The activation periods are specified in the parameters for activation period 444.

The parameters for activation period of the software components 411, 421, 431 are configured manually in accordance with the requirements of the plant to be controlled. When the plant that is controlled by the according software component changes, the software component has to be reconfigured. This reconfiguration work decreases the benefit of reusing control software across different plants.

SUMMARY OF THE INVENTION

It is an object of the present invention to reduce the above described problem by providing a suitable method of configuring a control algorithm and a suitable controller for controlling a plant in real-time. It is a further object of the present invention to provide a control algorithm generator for generating a suitable control algorithm.

These objects are accomplished by the subject-matter of the independent claims. Advantageous embodiments of the present invention are specified by the dependent claims.

The invention comprises a method of configuring a control algorithm being executable by a controller for controlling a plant in real-time. According to the invention, the method may comprise the steps of providing a control algorithm, subdividing the control algorithm into at least one task, providing algorithm data depending on the at least one task, providing plant data depending on at least one property of the plant, assigning a task activation time period to each task of the at least one task based on the algorithm data and the plant data, and scheduling the execution of the tasks of the control algorithm in accordance with the assigned task activation time periods.

This method has the advantage that the task activation time periods may be determined and assigned automatically, based on the provided algorithm data and the provided plant data. This allows for an automatic configuration of the control algorithm in accordance with the provided algorithm data and the provided plant data. Thus, manual configuration is no longer needed.

Preferably, the method according to the present invention comprises the steps of providing a control algorithm as at least one differential equation, and converting the control algorithm into at least one difference equation, wherein each difference equation has a time step relating to a task activation time period.

This is advantageous because it is easy to provide differential equations. These differential equations that cannot be executed by a digital controller are automatically converted into difference equations that are adapted to be configurable by assigning task activation time periods. Thus, a very convenient way for providing a control algorithm and converting the control algorithm into a form that can be executed and configured by the controller is provided.

In an advantageous embodiment, the method comprises the steps of providing a software component comprising said control algorithm, and installing said software component on said controller.

This has the advantage that the control algorithm may be provided as a software component that is installed on the controller. Providing the control algorithm as a software component is a very comfortable and efficient way of providing a control algorithm.

Preferably, the method according to the present invention comprises the step of activating the software component by an activation means, wherein the activation means is constituted by at least one unit of the group of units consisting of a real-time operating system, a periodic task scheduler, and a component activator.

The step of activating allows for example the real-time operating system to activate the software component and thereby schedule the according tasks of the control algorithm that is comprised in the software component.

Preferably, the method comprises the step of providing algorithm data depending on the at least one difference equation.

This has the advantage that a configuration means that configures the control algorithm may incorporate knowledge about the at least one difference equation when determining task activation time periods for the tasks being comprised in the control algorithm. This means, that knowledge about the control algorithm is incorporated into configuration decisions.

In an advantageous embodiment, the method comprises the step of providing plant data depending on a time constant of the plant.

The background is that different plants may differ in their control behavior. Some plants may require to receive control signals more often than others. Providing plant data depending on a time constant of the plant allows to incorporate the different time constants of the plants into the configuration decisions taken to configure the control algorithm.

Preferably, the method according to the present invention comprises the step of, upon change of the plant data, automatically assigning a task activation time period to each task of the at least one task based on the algorithm data and the changed plant data.

This allows to automatically assign changed task activation time periods when the plant data changes. In this way, the control algorithm may be automatically reconfigured when the plant is changed or an existing plant changes, for example, its time constant.

In an advantageous embodiment, the method according to the invention comprises the steps of determining whether the plant data has changed, and if the plant data has changed, reading the changed plant data, determining a task activation time period for each task of the at least one task based on the algorithm data and the changed plant data, and configuring the software component according to the determined task activation time periods.

These steps have the advantage that the software component is automatically reconfigured according to the determined task activation time periods, when the plant data changes.

The invention further comprises a controller for controlling a plant in real-time. The controller may comprise a control algorithm execution means for executing a control algorithm being subdivided into at least one task, algorithm data providing means for providing algorithm data depending on the at least one task, plant data providing means for providing plant data depending on at least one property of the plant, configuration means for assigning a task activation time period to each task of the at least one task based on the algorithm data provided by the algorithm data providing means and the plant data provided by the plant data providing means, and scheduling means for scheduling the execution of the tasks of the control algorithm in accordance with the task activation time periods assigned by the configuration means.

This controller has the advantage that the configuration means is able to automatically assign task activation time periods to the tasks of the control algorithm based on the algorithm data and the plant data. In this way, the controller is able to automatically configure the control algorithm.

Preferably, the controller comprises a software component receiving means for receiving a software component comprising said control algorithm.

This software component receiving means allows that the controller receives a software component that comprises the control algorithm. This is a comfortable and efficient way to provide a control algorithm that is executable by the controller.

In an advantageous embodiment, the controller comprises an activation means for activating the software component. The activation means may be, for example, constituted by at least one unit of the group of units consisting of a real-time operating system, a periodic task scheduler, and a component activator.

The activation means allows the controller to schedule the software components in a suitable manner. Preferably, the control algorithm comprises at least one difference equation, wherein each difference equation has a time step relating to a task activation time period.

Difference equations are a comfortable and effective way of providing a control algorithm that is executable by a digital controller.

Preferably, the controller comprises an algorithm data providing means for providing algorithm data depending on the at least one difference equation.

This algorithm data providing means has the advantage that is provides data about the difference equations such that the configurator may incorporate this data when it configures the control algorithm.

Preferably, the controller comprises a plant data providing means for providing plant data depending on a time constant of the plant.

In this way, plant data may be provided to the configuration means to enable the configuration means to incorporate the knowledge about the time constant of the plant into its configuration decisions.

In an advantageous embodiment, the configuration means is adapted to automatically assign a task activation time period to each task of the at least one task, upon change of the plant data, based on the algorithm data and the changed plant data.

This has the advantage that the configuration means is able to automatically assign adapted task activation time periods when the plant data changes. In this way, the control algorithm is automatically reconfigured when necessary.

Preferably, the controller comprises a change determination means for determining whether the plant data has changed, plant data reading means for reading the changed plant data, task activation time period determination means for determining a task activation time period for each task of the at least one task based on the algorithm data and the changed plant data, and software component configuration means for configuring the software component according to the determined task activation time periods.

These means allow the controller to notice a change of the plant data, to determine suitable task activation time periods taking into account the changed plant data and to configure the software component comprising the control algorithm accordingly.

Moreover, the present invention comprises a control algorithm generator for generating a control algorithm that is executable and configurable by the controller according to the present invention. The control algorithm generator may comprise control algorithm receiving means for receiving a control algorithm as at least one differential equation, and conversion means for converting the control algorithm into at least one difference equation, wherein each difference equation has a time step relating to a task activation time period.

This control algorithm generator allows to receive a control algorithm that is comfortably specified in differential equations and to convert the differential equations into difference equations that can be executed and configured by the controller according to the invention.

Preferably, the control algorithm generator comprises an algorithm data generation means for generating algorithm data based on the control algorithm.

This algorithm data generation means allows to generate algorithm data that may be used by the configuration means to determine task activation time periods that are suitable for configuring the according control algorithm.

In an advantageous embodiment, the control algorithm generator comprises a software component generation means for generating a software component based on said control algorithm.

Providing the control algorithm as a software component is a comfortable and effective way for providing a control algorithm that is executable and configurable by the controller.

In addition, the invention comprises a computer program product comprising a computer readable medium and a computer program recorded therein in form of a series of state elements corresponding to instructions which are adapted to be processed by a data processing means of a data processing apparatus such that a method according to the invention is performed or a controller according to the invention is formed or a control algorithm generator according to the invention is formed on the data processing means.

Performing the method according to the invention with the help of a computer program product comprising software that is executed on a general hardware is a very efficient way of performing the method. Forming a controller according to the invention with the help of such a computer program product allows for a high degree of flexibility and cost efficiency. Forming a control algorithm generator according to the invention by using a computer program product that comprises a software being executed on a general hardware is a cost-efficient and therefore preferable manner of providing a control algorithm generator.

BRIEF DESCRIPTION OF THE DRAWINGS

Advantageous embodiments and further details of the present invention will be described in the following with reference to the figures.

DESCRIPTION OF THE PREFERRED EMBODIMENTS (First Embodiment)

Figure 5:
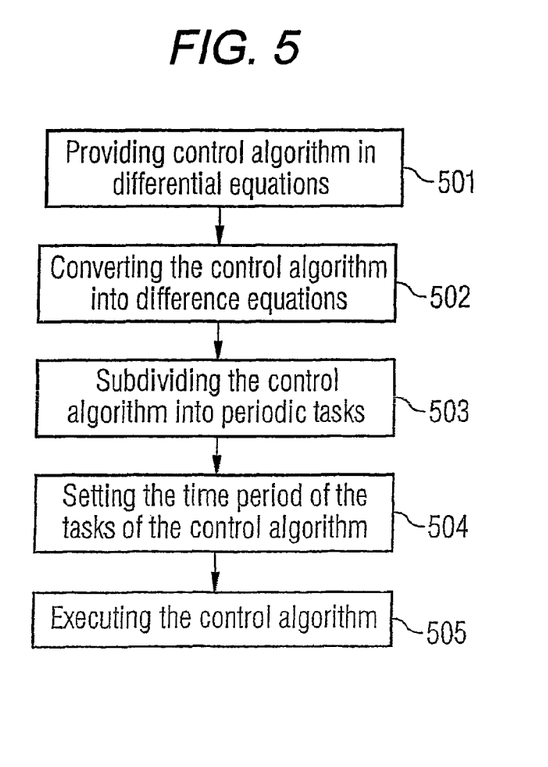
FIG. 5 shows one embodiment of a method of configuring a control algorithm according to the present invention.

FIG. 5 illustrates one embodiment of the method of configuring a control algorithm according to the present invention. In step 501, a control algorithm is provided in ordinary differential equations. An easy control algorithm would be, for example:

$$u(t) = K_P y(t) + K_D \frac{d\,y(t)}{dt}$$

This is a very easy PD control algorithm. y(t) denotes the difference between a target value and a measured value at time t. u(t) is the output of the control algorithm at time t. $K_P$ and $K_D$ are factors.

Since digital control systems can calculate only discretely, this ordinary differential equation has to be converted into a difference equation. After a conversion of the differential equation shown above, the following difference equation would result:

$$u_i = K_P y_i + K_D \frac{y_i - y_{i-1}}{\Delta t}$$

$y_i$ is the difference between a target value and a measured value at the execution step i. $u_i$ is the output of the control algorithm at the execution step i. $\Delta t$ is the time difference between the execution steps i and i−1. Such a conversion is performed in step 502 of the method shown in FIG. 5.

The resulting difference equation would be further transformed into software expressions. In ANSI-C language, the shown control algorithm would be, for example:

$u=KP*y+KD*(y-y\_\text{previous})/DT$

In real-time control systems, the activation time period of a software component depends on a time constant of the plant to be controlled, even if the expression of the control algorithm in ordinary differential equations (for example provided in step 501) is the same. Therefore, in the prior art the period DT is manually redefined, if the time constant of the control target (plant) is changed. This is a problem for reusing software components for real-time control systems.

The embodiment of the method according to the present invention shown in FIG. 5 solves this problem by the following steps:

In step 503, the control algorithm is subdivided into periodic tasks. However, the exact time period DT of the software components is not defined in this step. This happens later in step 504, in which the time period of the tasks of the control algorithm is set. In this step, the activation time period of each software component is set based on information about the periodic tasks and based on the time constant of the plant. Afterwards, the control algorithm is executed in step 505.

(Second Embodiment)

Figure 6:
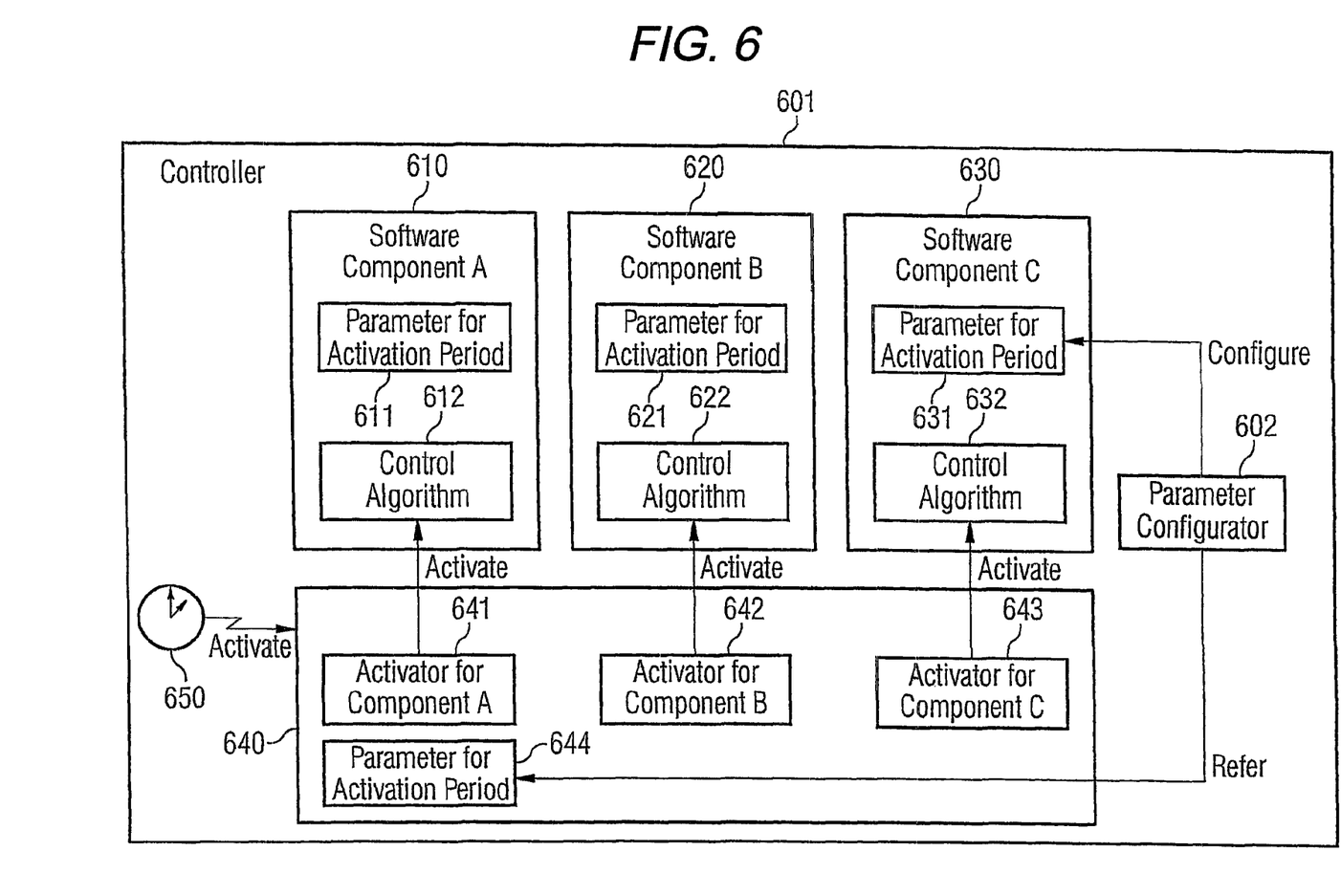
FIG. 6 shows one embodiment of a controller for controlling a plant in real-time according to the present invention.

FIG. 6 illustrates one embodiment for controlling a plant in real-time according to the present invention. The controller 601 shown in FIG. 6 comprises three different software components 610, 620, 630. Each software component comprises a control algorithm 612, 622, 632 and parameters that specify activation periods for the tasks comprised in the control algorithms 611, 621, 631.

The software components 610, 620, 630 are activated by dedicated activators 641, 642, 643 that are comprised in a periodic task scheduler 640 that is part of the controller. For the scheduling, the periodic task scheduler 640 uses a clock 650.

The periodic task scheduler further comprises parameters containing information about the plant to be controlled 644 that need to be incorporated into the activation periods of the software components and/or the activation periods of the tasks comprised in the control algorithm of the software components. The configuration of the activation period parameters 611, 621, 631 of the software components 610, 620, 630 is performed by a dedicated parameter configurator 602. The parameter configurator 602 reads the parameters of the plant 644, determines task activation time periods for each task of the at least one task based on information about the control algorithm to be configured and the plant data, and configures the software component according to the determined task activation time periods.

(Third Embodiment)

Figure 7:
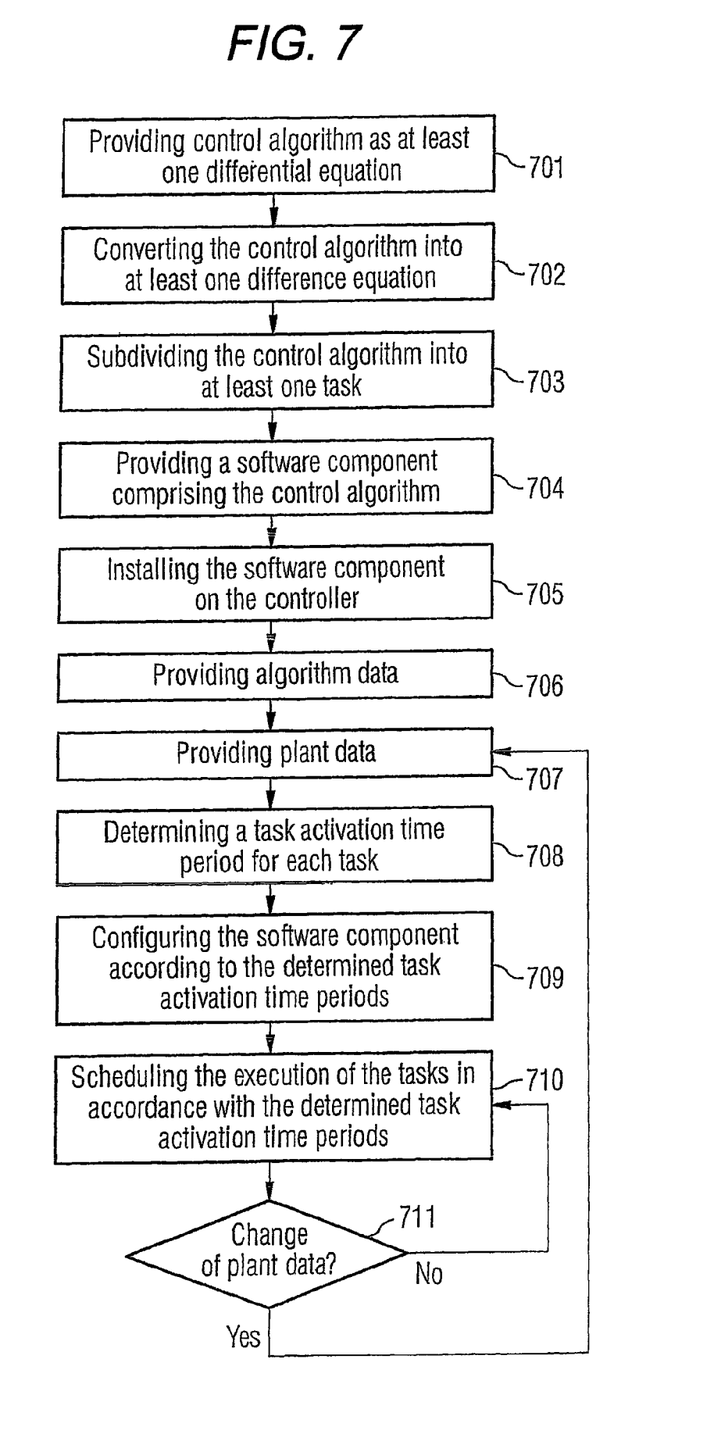
FIG. 7 shows another embodiment of a method of configuring a control algorithm according to the present invention.

FIG. 7 shows another embodiment of the method of configuring a control algorithm according to the present invention. In step 701, a control algorithm is provided as at least one differential equation. This differential equation is converted into at least one difference equation, each difference equation having a time step relating to a task activation time period, in step 702. In step 703, the control algorithm is subdivided into at least one task. Then, the control algorithm is transformed into a software component that is executable by a digital controller (step 704). In step 705, this software component is installed on the controller.

In step 706, algorithm data comprising information about the at least one task is provided. Plant data comprising information about at least one property of the plant is provided in step 707. In step 708, a task activation time period for each task of the at least one task is determined based on the algorithm data and the plant data. The software component is configured according to the determined task activation time periods in step 709. In step 710, the execution of the tasks of the control algorithm is scheduled in accordance with the assigned task activation time periods. In step 711, it is determined whether the plant data has changed. If this is not the case, the method returns to step 710, such that the scheduling of the execution of the tasks continues. If, however, the plant data has changed, the method jumps back to step 707, such that the changed plant data is read and new task activation time periods for each task are automatically determined again and the software component is reconfigured accordingly.

(Fourth Embodiment)

Figure 8:
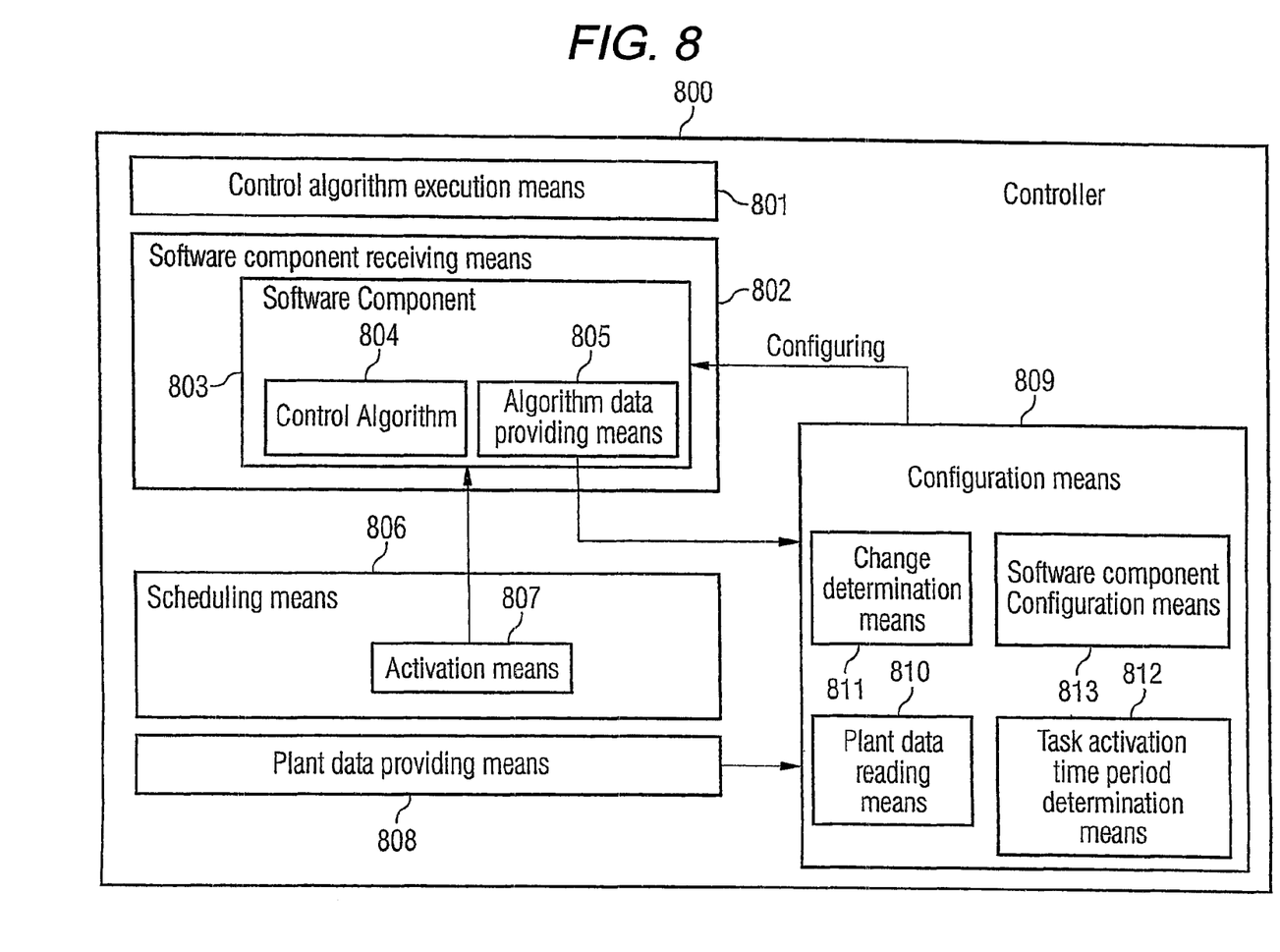
FIG. 8 shows another embodiment of a controller for controlling a plant in real-time according to the present invention.

FIG. 8 illustrates another embodiment of a controller for controlling a plant in real-time according to the present invention. According to this embodiment, the controller 800 comprises a control algorithm execution means 801 for executing a control algorithm being subdivided into at least one task. Furthermore, the controller 800 comprises a software component receiving means for receiving a software component comprising the control algorithm. The software component receiving means 802 shown in FIG. 8 already received a software component 803 that comprises a control algorithm 804 and an algorithm data providing means for providing algorithm data depending on the at least one task of the control algorithm 804. Of course, the software component receiving means 802 can receive and comprise more than one software component at the same time.

Furthermore, the controller 800 comprises a scheduling means 806 for scheduling the execution of the tasks of the control algorithm. The scheduling means 806 comprises an activation means 807 for activating the software component 803. Moreover, the shown embodiment of the controller comprises a plant data providing means 808 for providing plant data depending on at least one property of the plant to be controlled.

In addition, the shown embodiment of the controller comprises a configuration means 809. The configuration means comprises a change determination means 811 for determining whether the plant data provided by the plant data providing means 808 has changed, a plant data reading means 810 for reading the changed plant data, a task activation time period determination means 812 for determining a task activation time period for each task of the at least one task based on the algorithm data provided by the algorithm data providing means 805 and the changed plant data read by the plant data reading means 810, and a software component configuration means 813 for configuring the software component 803 according to the task activation time period determined by the task activation time period determination means 812.

(Fifth Embodiment)

Figure 9:
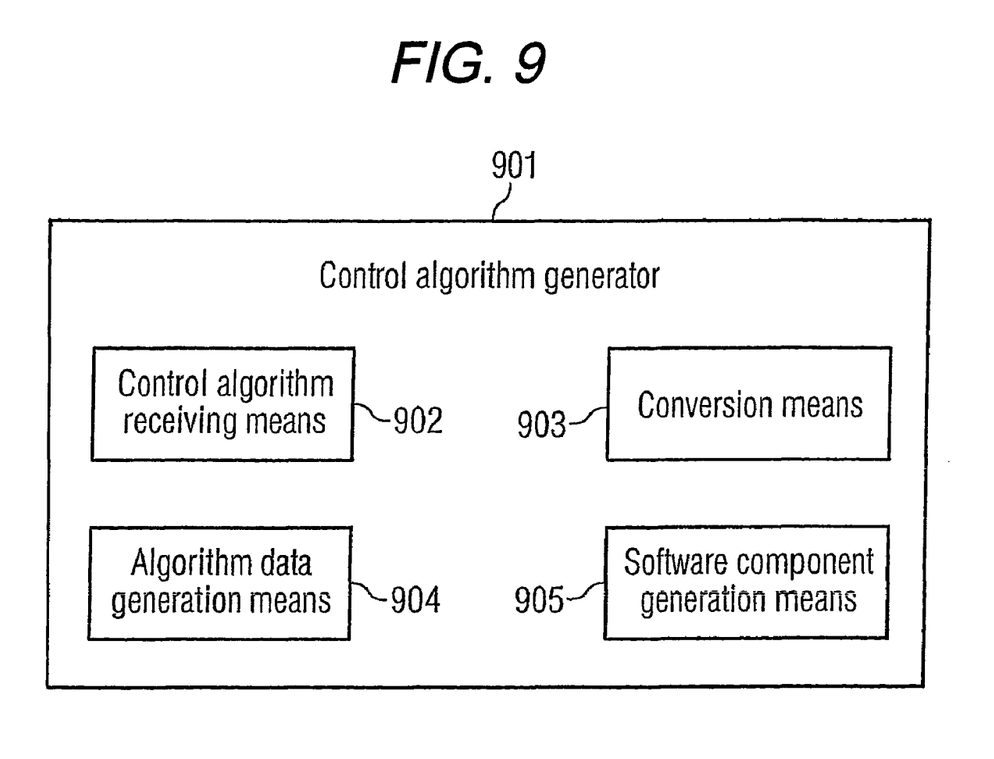
FIG. 9 shows one embodiment of a control algorithm generator according to the present invention.

FIG. 9 shows one embodiment of a control algorithm generator for generating a control algorithm according to the present invention. The embodiment of the control algorithm generator 901 shown in FIG. 9 comprises a control algorithm receiving means 902 for receiving a control algorithm as at least one differential equation. Furthermore, the control algorithm generator 901 comprises a conversion means 903 for converting the control algorithm into at least one difference equation, wherein each difference equation has a time step relating to a task activation time period. Moreover, the control algorithm generator 901 comprises an algorithm data generation means 904 for generating algorithm data based on the control algorithm. The control algorithm generator 901 also comprises a software component generation means 905 for generating a software component based on the control algorithm.

The specifications and drawings are to be regarded in an illustrative rather than a restrictive sense. It is evident that various modifications and changes may be made thereto, without departing from the scope of the invention as set forth in the claims. It is possible to combine the features described in the embodiments in a modified way for providing additional embodiments that are optimized for a certain usage scenario. As far as such modifications are readily apparent for a person skilled in the art, these modifications shall be regarded as implicitly disclosed by the above described embodiments.

What is claimed is:

1. A controller for controlling a plant in real-time, comprising:
   a control algorithm execution means for executing a control algorithm being subdivided into at least one task,
   algorithm data providing means for providing algorithm data depending on the at least one task,
   plant data providing means for automatically providing plant data depending on at least one property of the plant,
   a parameter configurator for reading the plant data provided by the plant data providing means, and for automatically configuring a task activation period parameter that specifies a task activation period of the control algorithm based on the algorithm data provided by the algorithm data providing means and the plant data provided by the plant data providing means, software component configuration means for automatically configuring a software component comprising the control algorithm according to the task activation period, and scheduling means for scheduling the execution of the tasks of the control algorithm in accordance with the task activation period.

2. The controller according to claim 1, further comprising software component receiving means for receiving the software component comprising the control algorithm.

3. The controller according to claim 1, further comprising activation means for activating the software component.

4. The controller according to claim 3, wherein the activation means is constituted by at least one unit of a group of units consisting of a real-time operating system, a periodic task scheduler, and a component activator.

5. The controller according to claim 1, wherein the control algorithm comprises at least one difference equation, each difference equation having a time step relating to a task activation period.

6. The controller according to claim 1, further comprising an algorithm data providing means for providing algorithm data depending on at least one difference equation.

7. The controller according to claim 1, wherein the plant data depends on a time constant of the plant.

8. The controller according to claim 1, wherein the parameter configurator automatically reconfigures the task activation period parameter upon change of the plant data, based on the algorithm data and the changed plant data.

9. The controller according to claim 1, further comprising:
change determination means for determining whether the plant data has changed,
wherein the parameter configurator automatically reconfigures a task activation period for each task of the at least one task based on the algorithm data and the changed plant data.

10. A control algorithm generator for generating a control algorithm being executable by a controller for controlling a plant in real-time, comprising:
control algorithm providing means for providing a control algorithm;
control algorithm subdividing means for subdividing the control algorithm into at least one task;
algorithm data providing means for providing algorithm data depending on the at least one task;
plant data providing means for automatically providing plant data depending on at least one property of the plant;
a parameter configurator for reading the plant data provided by the plant data providing means, and for automatically configuring a task activation period parameter that specifies a task activation period of the control algorithm based on the algorithm data provided by the algorithm data providing means and the plant data provided by the plant data providing means, for each task of the at least one task; and
scheduling means for scheduling execution of the tasks of the control algorithm in accordance with the task activation periods.

11. The control algorithm generator according to claim 10, further comprising:
differential equation providing means for providing the control algorithm as at least one differential equation; and
difference equation converting means for converting the control algorithm into at least one difference equation, each difference equation having a time step relating to a task activation period.

12. The control algorithm generator according to claim 10, further comprising:
software component providing means for providing the software component comprising the control algorithm; and
install means for installing the software component on the controller.

13. The control algorithm generator according to claim 10, further comprising:
software component activation means for activating the software component, wherein the activation means is constituted by at least one unit of a group of units consisting of a real-time operating system, a periodic task scheduler, and a component activator.

14. The control algorithm generator according to claim 10, wherein the algorithm data providing means for providing algorithm data depends on at least one difference equation.

15. The control algorithm generator according to claim 10, wherein the plant data providing means for providing plant data depends on a time constant of the plant.

16. The control algorithm generator according to claim 10, wherein the parameter configurator automatically reconfigures the task activation period parameter for each task of the at least one task based on the algorithm data and the changed plant data upon change of the plant data.

17. The control algorithm generator according to claim 10, further comprising:
determining means for determining whether the plant data has changed;
wherein the parameter configurator automatically reconfigures a task activation time period for each task of the at least one task based on the algorithm data and the changed plant data.

18. A controller for controlling an object to be controlled in a real-time, comprising:
a plurality of software components, each of which includes a respective control algorithm for controlling the object and a respective activation period parameter that specifies an activation period of the respective control algorithm;
a periodic task scheduler that activates each of the control algorithms of the plurality of software components;
a clock that provides a clock signal to the periodic task scheduler; and
a parameter configurator that automatically configures the activation period parameters;
wherein the periodic task scheduler comprises parameters containing information about the object; and
wherein the parameter configurator reads the parameters containing information about the object from the periodic task scheduler, and automatically configures the activation period parameters based on the parameters containing information about the object.

19. The controller according to claim 18, further comprising software component receiving means for receiving the software components comprising the control algorithms.

20. The controller according to claim 18, further comprising activation means for activating the software components.

21. The controller according to claim 20, wherein the activation means is constituted by at least one unit of a group of units consisting of a real-time operating system, the periodic task scheduler, and a component activator.

22. The controller according to claim 18, wherein a control algorithm comprises at least one difference equation, each difference equation having a time step relating to an activation period.

23. The controller according to claim 18, further comprising algorithm data providing means for providing algorithm data depending on at least one difference equation.

24. The controller according to claim 18, further comprising plant data providing means for providing plant data depending on a time constant of the plant.

25. The controller according to claim 18, wherein the parameter configurator automatically reconfigures the activation period parameters upon change of the plant data, based on the algorithm data and the changed plant data.

26. The controller according to claim 18, further comprising:
    change determination means for determining whether the plant data has changed;
    wherein the parameter configurator automatically reconfigures the activation period parameters based on the algorithm data and the changed plant data.

* * * * *